United States Patent [19]

Kummer et al.

[11] Patent Number: 5,210,756
[45] Date of Patent: May 11, 1993

[54] FAULT DETECTION IN RELAY DRIVE CIRCUITS

[75] Inventors: Karl T. Kummer, Doylestown; Robert W. Bristow, Hatboro; Paul F. McLaughlin, Hatfield; Hieu T. Duong, Norristown, all of Pa.

[73] Assignee: Honeywell Inc., Minneapolis, Minn.

[21] Appl. No.: 588,387

[22] Filed: Sep. 26, 1990

[51] Int. Cl.$^5$ ............................................. G06F 11/00
[52] U.S. Cl. ...................................... 371/8.1; 371/8.2
[58] Field of Search ................... 371/8.1, 8.2, 9.1, 36, 371/68.1, 68.2, 68.3, 25.1, 20.1; 370/112

[56] References Cited

U.S. PATENT DOCUMENTS

| | | | |
|---|---|---|---|
| 3,665,173 | 5/1972 | Bouricius et al. | 371/9.1 |
| 3,681,578 | 8/1972 | Stevens | 371/9.1 |
| 4,181,945 | 1/1980 | Adler et al. | 371/9.1 |
| 4,358,823 | 11/1982 | McDonald et al. | 371/9.1 |
| 4,442,502 | 4/1984 | Friend et al. | 371/8.1 |
| 4,562,575 | 12/1985 | Townsend | 371/9.1 |
| 4,672,530 | 6/1987 | Schuss | 371/9.1 |
| 4,691,315 | 9/1987 | Murphy et al. | 371/9.1 |
| 4,716,531 | 12/1987 | Saunder et al. | 371/9.1 |
| 4,868,826 | 9/1989 | Smith et al. | 371/9.1 |
| 4,965,714 | 10/1990 | Knecht | 371/8.1 |

FOREIGN PATENT DOCUMENTS

6242423 7/1983 Japan .

Primary Examiner—Robert W. Beausoliel, Jr.
Assistant Examiner—Phung My Chung
Attorney, Agent, or Firm—A. A. Sapelli; R. Jensen; W. Udseth

[57] ABSTRACT

A system has at least one output device, the output device having a first set of output terminals connected to a corresponding field device. Each output device has a corresponding redundant output device having a corresponding first set of output terminals connected to the same corresponding field device as the corresponding output device. The output device and the redundant output device each have a second set of output terminals corresponding to the first set of output terminals, the second set of output terminals being connected to an apparatus for controlling the information outputted from the first set of output terminals. The apparatus comprises a plurality of switching elements, having a set of first and second contact points. Each of the second set of output terminals of the output device being connected to a corresponding first contact point, and the second set of output terminals of the redundant output device being connected to the corresponding second contact point. An activating element activates the plurality of switching elements in response to a control signal from the output device and the redundant output device such that the information outputted from the output device or the redundant output device is prevented from being coupled to the field device.

6 Claims, 8 Drawing Sheets

FAULT DETECTION IN RELAY DRIVE CIRCUITS

RELATED PATENT APPLICATIONS

The present application is related to U.S. Pat. application, Ser. No. 07/588,386, entitled "Universal Scheme of Input/Output Redundancy in a Process Control System", by Paul McLaughlin et. al., filed on even date herewith, and assigned to Honeywell Inc., the assignee of the present application.

BACKGROUND OF THE INVENTION

The present invention relates to an apparatus and method of relay fault detection, and more particularly, to an apparatus and method of detecting faults in a relay network, including relays used for switching redundant or back-up equipment of a system in the event of an error, while the system is performing its normal and intended function (i.e., on-line).

Process Control Systems with backup process controllers such as described and claimed in U.S. Pat. No. 4,133,027, issued to J.A. Hogan on Jan. 2, 1979, and U.S. Pat. No. 4,141,066, issued to Y. Keiles on Feb. 20, 1979, include a backup controller having a dedicated Random Access Memory (RAM) and a dedicated Read-Only Memory (ROM). The back-up controller is essentially idle or can be doing some background tasks, but not tasks relating directly to the process control function. Upon detection of a failure of one of the primary process controllers, the data stored in the RAM of the failed controller must be transferred to the RAM of the backup controller to perform the operations of the primary controller. These systems describe a 1:N redundancy system.

Existing systems, such as that described in U.S. Pat. application, Ser. No. 07/299,859, filed on Jan. 23, 1989, and assigned to Honeywell Inc., the assignee of the present application, provide for a 1:1 redundancy system, whereby the data base of a secondary device (i.e., secondary or backup controller) is updated periodically such that the updating process is transparent to the primary functions and does not tie-up (or penalize) CPU or processor performance and utilizes a minimum amount of time. When a failover condition occurs, there is a period of time when no communications can take place (i.e., an outage) between the primary controller and the remainder of the system.

Previously, a relay switch was controlled by a single microprocessor. If more than one relay switch was required (due to the number of contacts required), then multiple outputs from that microprocessor were used. Multiple inputs were also returned to the microprocessor to detect faults.

Thus there is provided by the present invention an apparatus and method which provides for the detection of faults of relay switching circuits which might otherwise go undetected and thereby preventing the proper operation of relay switch circuits. In the present invention, control of the relay switch circuits is shared by two microprocessors, each microprocessor having only one output and one input to the relay switch circuit, thereby minimizing interconnection which limit fault propagation and minimizes interconnection costs.

SUMMARY OF THE PRESENT INVENTION

Therefore, there is provided by the present invention, an apparatus and method for providing fault detection of relay switch circuits. A system has at least one output device, the output device having a first set of output terminals connected to a corresponding field device. Each output device has a corresponding redundant output device having a corresponding first set of output terminals connected to the same corresponding field device as the corresponding output device. The output device and the redundant output device each have a second set of output terminals corresponding to the first set of output terminals, the second set of output terminals being connected to an apparatus for controlling the information outputted from the first set of output terminals.

The apparatus comprises a plurality of switching elements, having a set of first and second contact points. Each of the second set of output terminals of the output device being connected to a corresponding first contact point, and the second set of output terminals of the redundant output device being connected to the corresponding second contact point. An activating element activates the plurality of switching elements in response to a control signal from the output device and the redundant output device such that the information coupled to the first set of output terminals for the output device or the information coupled to the first set of output terminals for the redundant output device is prevented from being coupled to the field device.

A method for verifying the operability of the apparatus comprises the steps of transmitting a first control signal from IOP B thereby preventing the activating element to cause the switching element to switch. A second control signal is transmitted from IOP A to cause the control signal to stimulate the activating element notwithstanding the stimulation by the first control signal. Resultant signals are observed from the activating element to compare to a expectant result thereby verifying the operability of the activating element and other sections of the circuit.

Accordingly, it is an object of the present invention to provide an apparatus for detecting faults of a relay switch circuit.

It is another object of the present invention to provide an apparatus for detecting faults of a relay switch circuit having minimum corrections to a controlling device.

It is still another object of the present invention to provide a method of verifying the operability of the relay switch circuit while the controlling device is performing its intended control function.

These and other objects of the present invention will become more apparent when taken in conjunction with the following description and attached drawings, wherein like characters indicate like parts, and which drawings form a part of the present application.

DETAILED DESCRIPTION

Figure 1:
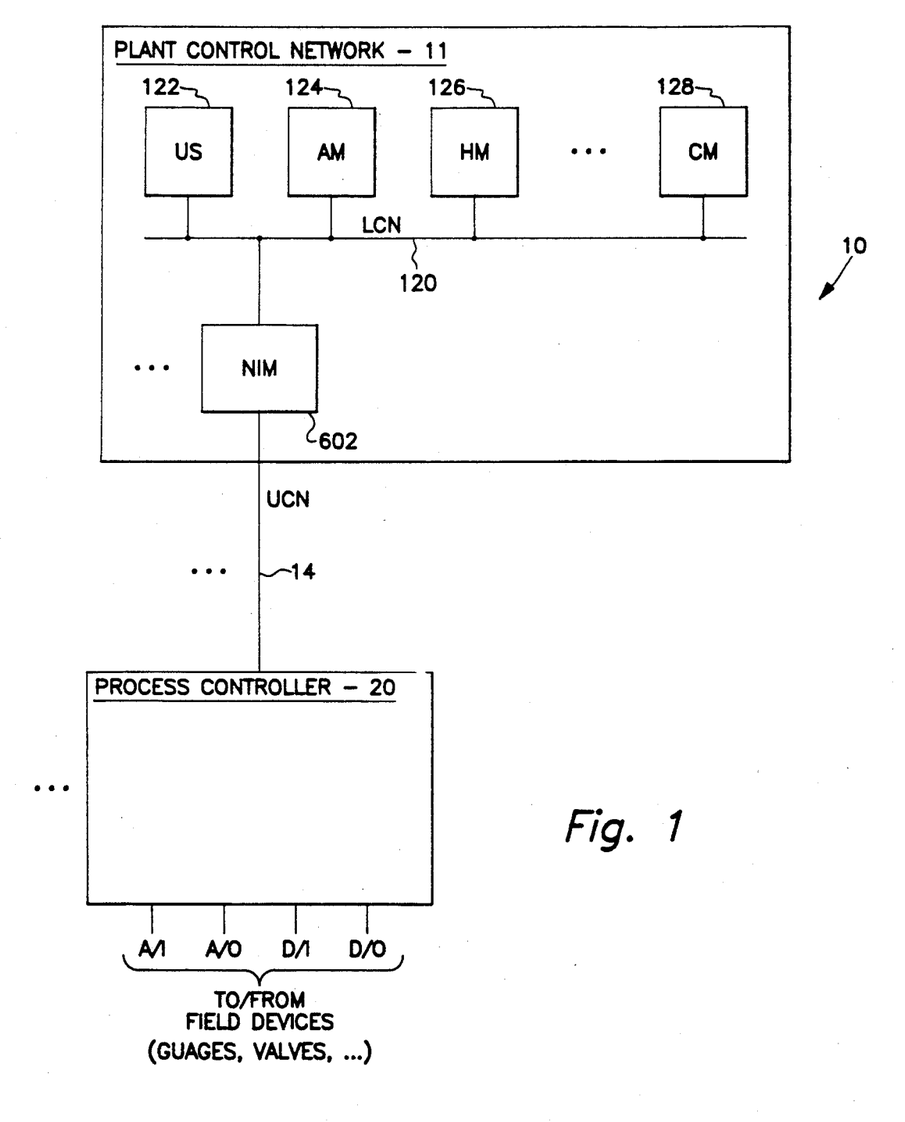
FIG. 1 shows a block diagram of a process control system in which the present invention may be utilized.

Before describing the apparatus and method of the present invention, it will be helpful in understanding a system environment in which the apparatus can be utilized. Referring to FIG. 1, there is shown a block diagram of a process control system 10 in which the apparatus of the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
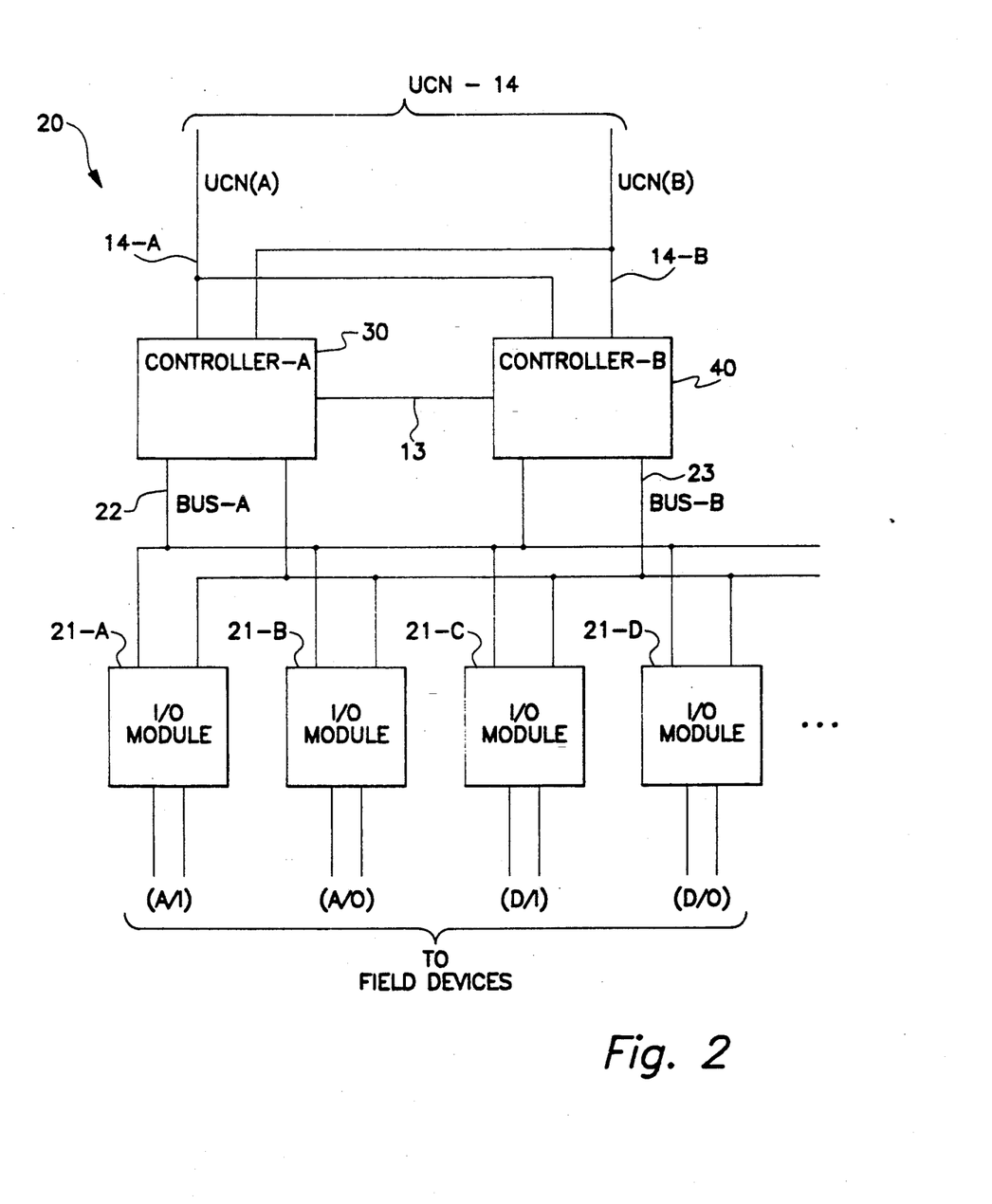
FIG. 2 shows a block diagram of a process controller, including I/O modules, in which the present invention may be utilized.

Referring to FIG. 2 there is shown a block diagram of the process controller 20, which includes the apparatus of the present invention. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input output (I/O) modules 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 interfaces to each I/O module 21 via bus A 22 and bus B 23, and controller B 40 interfaces to each I/O module 21 via bus A 22 and bus B 23.

Controller A and controller B, 30, 40, can communicate with each other via three mediums, the UCN 14, a link 13 between the controllers, and the buses A, B, 22, 23, and bus A and bus B in the preferred embodiment being serial I/0 links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/0 modules 21. In addition, the controller acting as the primary controller communicates with the plant control network 11 reporting status history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20. In the preferred embodiment, the secondary controller is optional.

Figure 3:
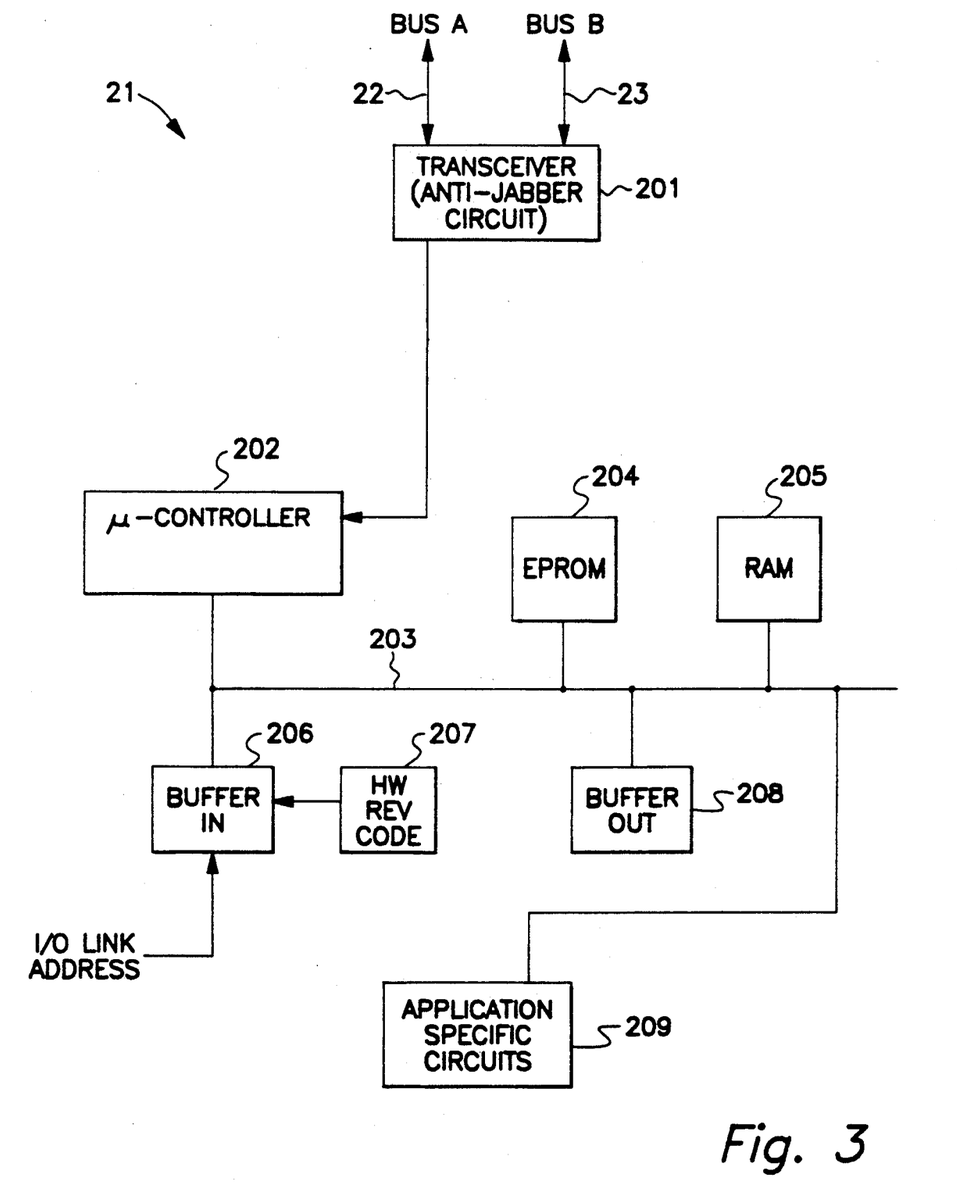
FIG. 3 shows a block diagram of an I/O module which includes the apparatus of the present invention.

Referring to FIG. 3 there is shown a block diagram of an I/O module. A transceiver (anti-jabber circuit) 201 interfaces with bus A 22 and bus B 23. The transceiver 201 interfaces with a microcontroller (u-controller) 202 which, in the preferred embodiment, is of the type, Intel 80C31. The microcontroller is coupled to a local bus 203, and includes an EPROM 204 and a RAM 205 also attached to the local bus 203. The RAM 205 contains the information which forms the database for the I/O module 21. The EPROM 204 contains the program information utilized by the microcontroller 202. Also attached to local bus 203 is an input buffer which receives the I/O link address information and status inputs. The output buffer (BUFFER OUT) 208 is connected to the local bus 203. The application specific circuits 209 is also connected to the local bus 203 and interfaces with the input and output buffers 206, 208, and the microcontroller 202 via the local bus 203. The application specific circuits 209 vary from I/O module to I/O module depending on the field device to which the I/0 module is to be coupled. If the field device is of a type which requires a digital input, then the application specific circuit 209 will include the logic in order to place the digital input into a predefined format which will interface with the remainder of the I/0 module. Likewise, if the field device is such that requires an analog input, then the application specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, . . .) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits)... and generating a signal in a predetermined format having predetermined scale (i.e., engineering units, normalized units, percent of scale, . . .). In the preferred embodiment seven types of applications specific circuits are provided for, these include a high level analog input, low level analog input, analog output, digital input, digital output, smart transmitter interface, and pulse input counter.

Figure 4:
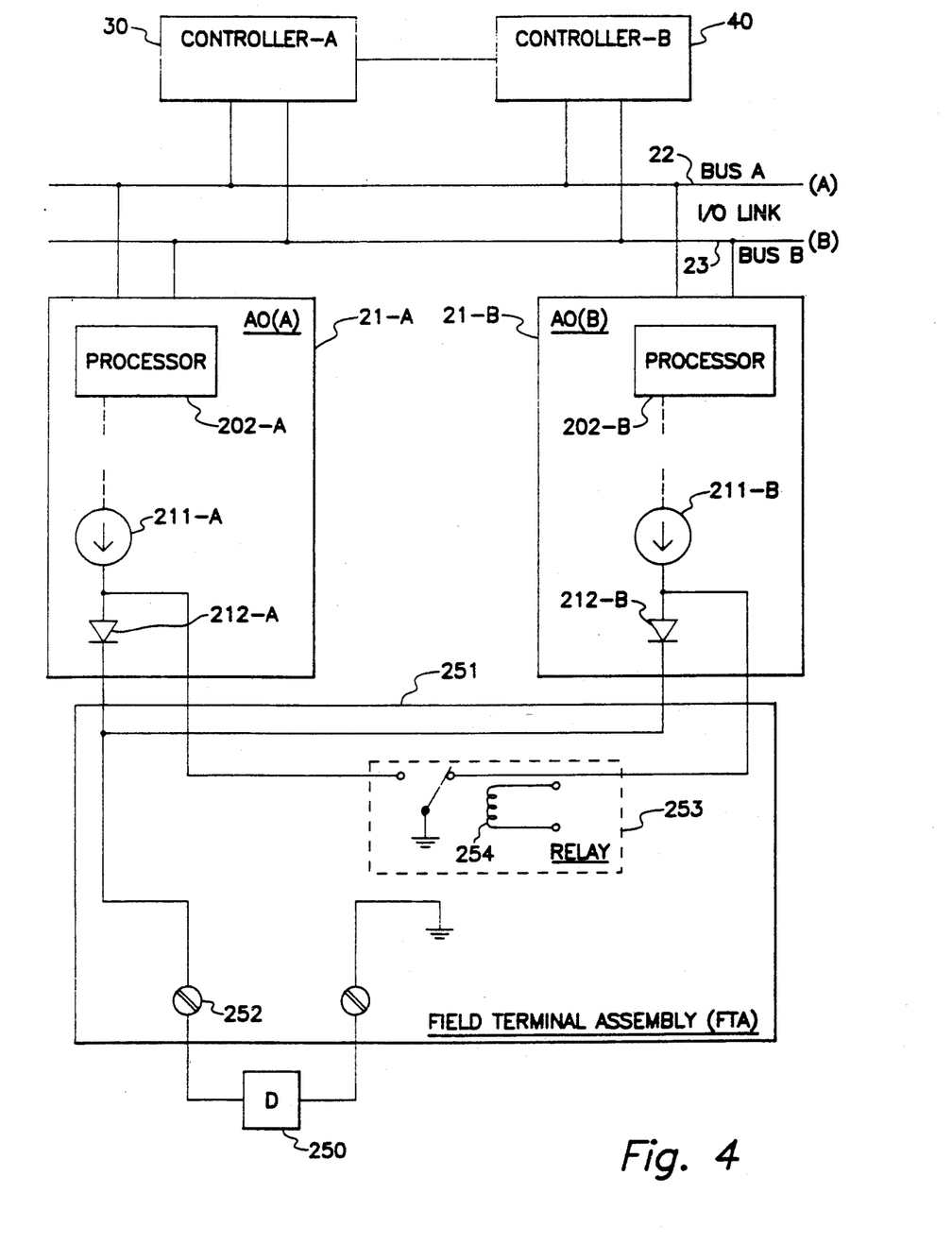
FIG. 4 shows a functional block diagram of embodiment of the apparatus of the present invention.

Referring to FIG. 4, there is shown a functional block diagram of the apparatus of the present invention. As described above, the process controller 20 includes controller A 30 and controller B 40 connected to the I/O link 22,23. Also connected to the I/O link 22,23 are the I/O modules 21 (also referred to herein as input-/output processor IOP). In a redundancy scheme of the preferred embodiment of the present invention, the analog output type I/O module 21 is duplicated, shown in FIG. 4 as AO(A) 21-A and AO(B) 21-B. (Other I/O modules are connected to the I/O link 22,23 as discussed above, but are not show here for simplicity and in order to focus on the redundancy feature of the present invention.) Each IOP includes a processor 202-A, 202-B. IOP AO(A) and IOP AO(B) are both connected to a field device (D) 250, through a field terminal assembly (FTA) 251, the field device being a valve, . . . . Both IOPs, AO(A) 21-A and AO(B) 21-B are performing the same tasks and outputting the same information (presuming no errors in either IOP) to the FTA 251. However, the output from only one IOP is actually coupled to the field device 250, as will now be discussed.

In the preferred embodiment of the present invention, one IOP is designated the main or primary IOP and the other is designated the backup or redundant IOP. Here, IOP AO(A) 21-A is designated the main IOP interfacing with field device 250, and IOP AO(B) 21-B is designated the redundant IOP. Both IOPs are outputting information from a current source 211-A, 211-B. The output information is coupled to a common point 252 (a terminal sometimes referred to as the customer screw), through a corresponding diode 212-A, 212-B. A common point between the current source 211-A and diode 212-A of AO(A) 21-A is coupled to a first contact point of a relay 253 and a common point between current source 211-B and diode 212-B of AO(B) 21-B is coupled to a second contact point of relay 253. The arm of relay 253 is connected to a ground point and is also normally switched, i.e. no current through the coil 254, to the second contact point of the relay 253, such that the output of the second current source 211-B of AO(B) 21-B is shorted to ground. In this manner only the output information from AO(A) 21-A is coupled to the field device 250. In the event of a failure of AO(A) 21-A, the relay 253 switches such that the output from AO(A) 21-A is shorted to ground and the output from the redundant IOP AO(B) 21-B is immediately coupled to the customer screw 252, and thus to the field device 250. The switching of relay 253 is initiated by activating a coil 254 of relay 253. Control of the coil is discussed in detail hereinunder.

Figure 5:
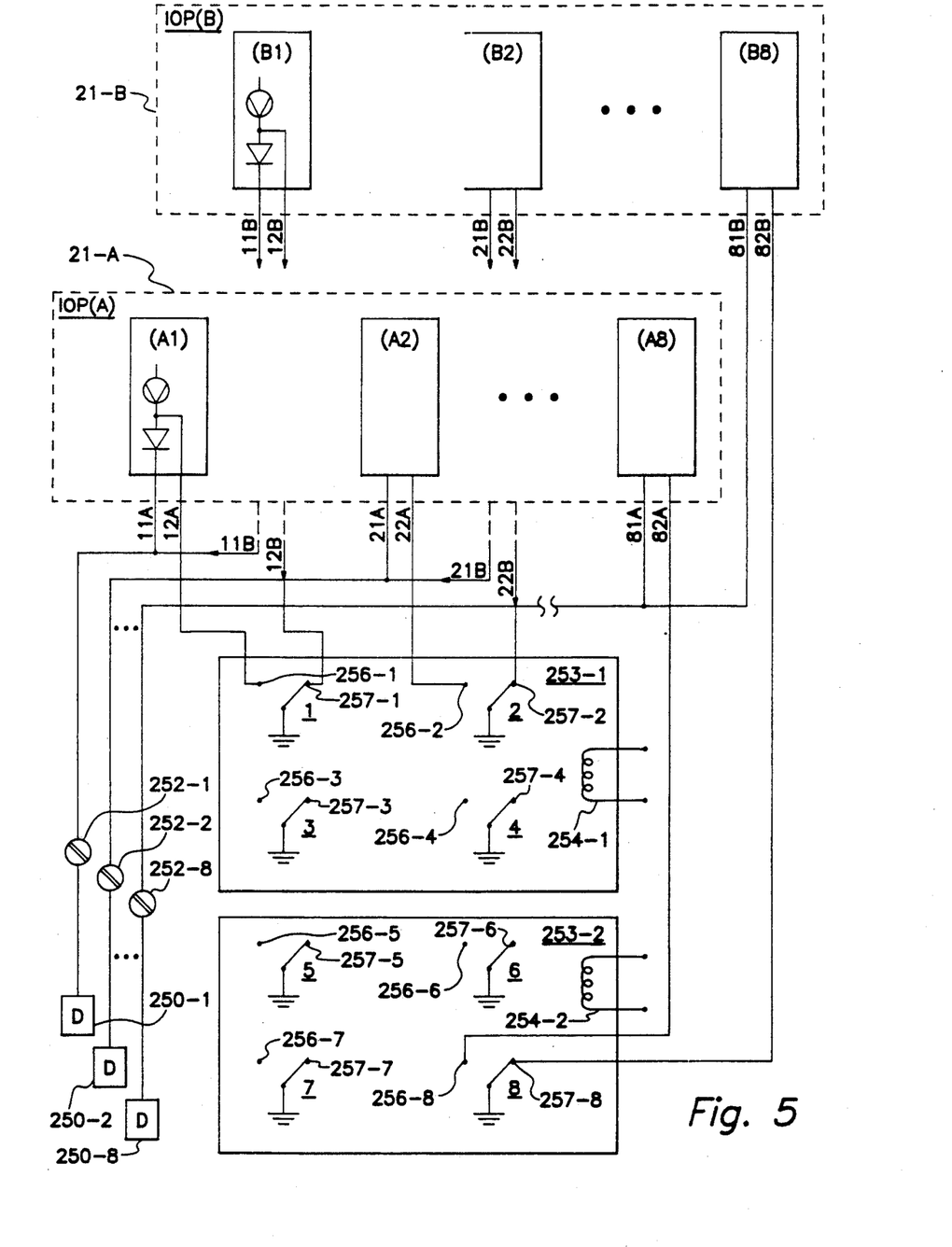
FIG. 5 shows a functional block diagram of the preferred embodiment of the apparatus of the present invention.

Each specific type IOP can handle a plurality of interface signals, the analog output module (AO) being able to handle 8 analog devices. Referring to FIG. 5, there is shown a diagram of the preferred embodiment of the present invention. A first AO module, IOP(A), AO(A) 21-A has a first set of outputs 1-8 (denoted as 11A, 21A,... 81A) and a corresponding second set of outputs (denoted as 12A, 22A,... 82A). A second AO module, the redundant module IOP(B) AO(B) 21-B, also has a first set of outputs (denoted as 11B, 21B,... 81B) and a corresponding second set of outputs (denoted as 12B, 22B,... 82B). Thus the outputs of the IOPs are denoted XY-Z. The X relates to the output terminal number 1 through 8. For Y=1, the first set of outputs is denoted, all of these outputs being connected to the customer screw of a device D1, D2,... D8. For Y=2, the second set is denoted, each second set being connected to a set of contacts of the relay 253. Z is either an A or B denoting IOP(A) or IOP(B). The second set of outputs goes to the first contact point of a corresponding relay for the IOP(A) and the second set of outputs for IOP(B) goes to a corresponding second contact point of the corresponding relay 257. Thus for the relay coil unactivated all the second set of outputs from IOP(B) will be shorted to common, and all the second set of outputs from IOP(A) will be coupled to the first contact point of the corresponding relay which will be open thereby permitting the output current on the first set of output terminals from IOP(A) (11A, 21A, . . . 81A) to be delivered to the corresponding field device 250. The relays which are commercially by a single coil, thus as shown in FIG. 5 two relay circuits 253-1 and 253-2 are utilized to control the coupling of the eight output currents to eight analog devices.

Normally, the relays are switched such that IOP(A) is communicating with the field device 250 and IOP(B) is in the backup mode (i.e., its outputs are shorted to common by the relay 253-1, 253-2). Conceivably, the system, and more specifically the relay switch circuit 253, can remain in this configuration for a long time, such as 1 year, 10 years, and perhaps even 20 years, before a preventive maintenance test or a failure of IOP(A) occurs. At that point in time, IOP(B) is to communicate with the field device, as a result of relay circuit 253 switching, such that the first set of contact points of the 8 sets of relay contact points is shorted to common. This is achieved by activating the relay coils 254-1, 254-2 causing the relay arm to switch. If one set of contact points fails to switch, the effect on the process being controlled can be handled. However, if the coil(s) fails such that 4 sets of contact points or 8 sets of contact points fail to switch, the effect on the process being controlled can be catastrophic. Thus it is desired to test the relay coil without disrupting the operation of the controlled process (i.e., without causing the relay arm to switch contact points).

Figure 6:
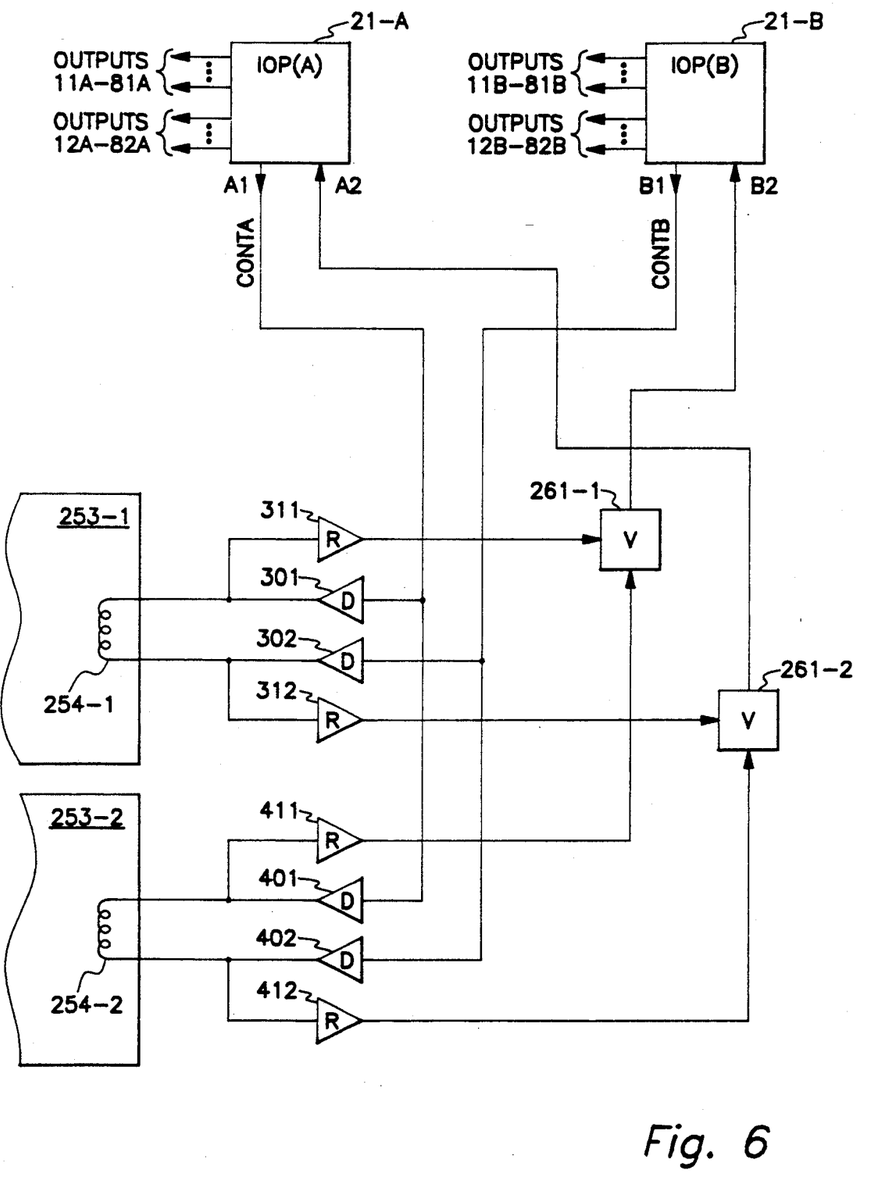
FIG. 6 shows a block diagram of the circuit utilized for controlling and testing the relay switch circuit of the preferred embodiment of the present invention.

Referring to FIG. 6, there is shown a block diagram of the circuit utilized for controlling and testing the relay switch circuit of the preferred embodiment of the present invention. Both relay coils must be operative for the diagnostic test to pass. The relay coil 254-1 is connected to drivers 301, 302, and relay coil 254-2 is connected to drivers 401, 402. Driver 301 for the first relay coil 254-1 and driver 401 for the second relay coil 254-2 are both connected to an output terminal A1 of IOP(A). Driver 302 for the first relay coil 254-1 and driver 402 for the second relay coil 254-2 are both connected to an output terminal B1 of IOP(B). The output terminal A1 from IOP(A) delivers a test signal CONTA to the respective drivers and output terminal B1 from IOP(B) delivers a test pattern CONTB to the respective drivers, the test patterns to be discussed below. The relay coils are also connected to receiver circuits, relay coil 254-1 being connected to receiver circuit 311, 312, and relay coil 254-2 being connected to receiver circuit 411, 412. The receiver circuit 311 from the first relay coil and the output of the receiver circuit 411 from the second relay coil is coupled to a first voting circuit (v)261-1, and the output of receiver circuit 312 from the first relay coil and the output of receiver 412 from the second relay coil are coupled to a second voting circuit (v)261-2. The output of the first voting circuit is coupled to an input terminal B2 of IOP(B) and the output of the second voting circuit 261-2 is coupled to a terminal A2 of IOP(A).

When testing of the relay coils is to be initiated, the controller A 30 (or controller B 40 if it is functioning as the primary controller), initiates a command to IOP(A) and IOP(B) to start the testing. IOP(A) and IOP(B) deliver test patterns to the relay coils from the output terminal A1 and B1, and the results are observed at the input terminals A2 and B2 of the respective IOPs. As a result the IOPs can determine a pass/fail result of the test. As a result of the initiation of the start of testing by the control 30, IOP(A) and IOP(B) are essentially synchronized, and the test patterns are sufficiently long such that tolerances are accounted for.

Figure 7:
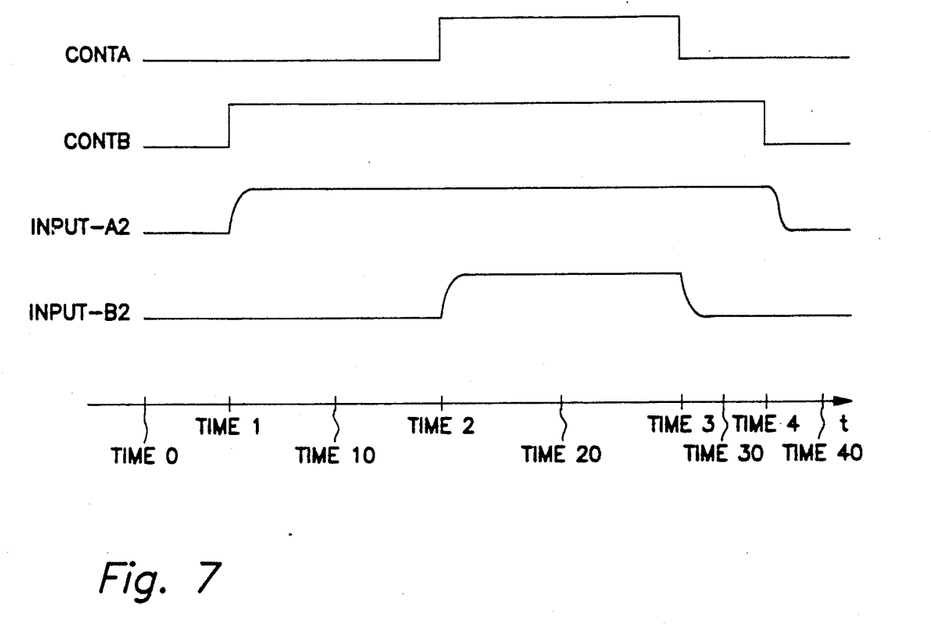
FIG. 7 shows a timing diagram of the test patterns utilized for testing the relay switch circuit.

Referring to FIG. 7, there is shown a timing diagram of the test patterns utilized for testing the relay switch circuit, and more particularly, the relay coils of the relay switch circuit (since the failure mode of concern here is a failure of the coil). Initially the test signal CONTA and CONTB are initially low. At time 1 CONTB switches high. As a result, the signal is driven through driver 302, 402 through the relay coil 254-1, 254-2, and through the receiver 311, 411 to the respective inputs of the first voting circuit 261-1. As a result the input to IOP(A), input terminal A2, switches high. The output of the second voting circuit 261-2 remains low since the inputs to the second voting circuit are both low since no signal has been outputted from CONTA. At time 2, IOP(A) outputs a signal CONTA which is high and is coupled to the drivers 301, 401. The signal is then coupled through the respective relay coils to the receivers 312, 412 to the respective inputs of the second voting circuit 261-2. Since both inputs for the second voting circuit are a one, or high, the output switches to a one, hence the input to the second terminal B2 of IOP(B) goes high. (If one of the relay coils was open it would be understood by one skilled in the art that the test pattern would not follow the above. As a result the IOPs would detect that the expected result has not been achieved and therefore would indicate a failure). At time 3 the output signal CONTA goes low and as a result the output of the second voting circuit 261-2 goes low, hence the signal coupled to input terminal B2 of IOP(B) also goes low. Finally at time 4, the output signal from CONTB goes low. By sensing the level on input A2 and input B2 at time 0, time 10, time 20, time 30, and time 40, the possible circuit faults can be detected. In this manner both relay coils have been tested, and since the output CONTB is high the contacts will never switch, since CONTA must be high and CONTB must be low in order for the contacts to switch. Since the contacts never switch, the normal operation (i.e., the outputs from the IOP which is driving the customer screw) continues in its normal fashion and is never interrupted. It will be understood by those skilled in the art that various test waveforms/test patterns can be utilized encompassing the above discussed basic concepts.

Figure 8:
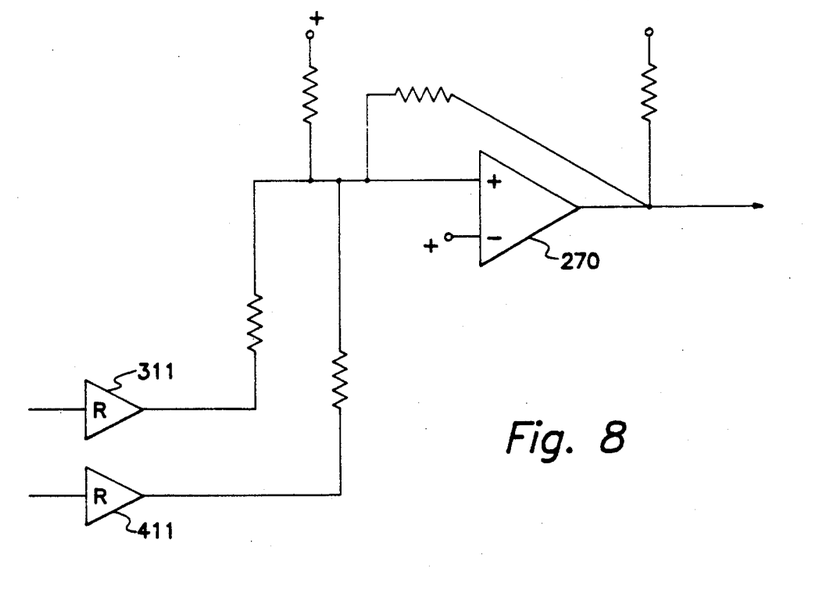
FIG. 8 shows a circuit diagram of a voting circuit utilized in the testing of the relay switch circuit.
Figure 9:
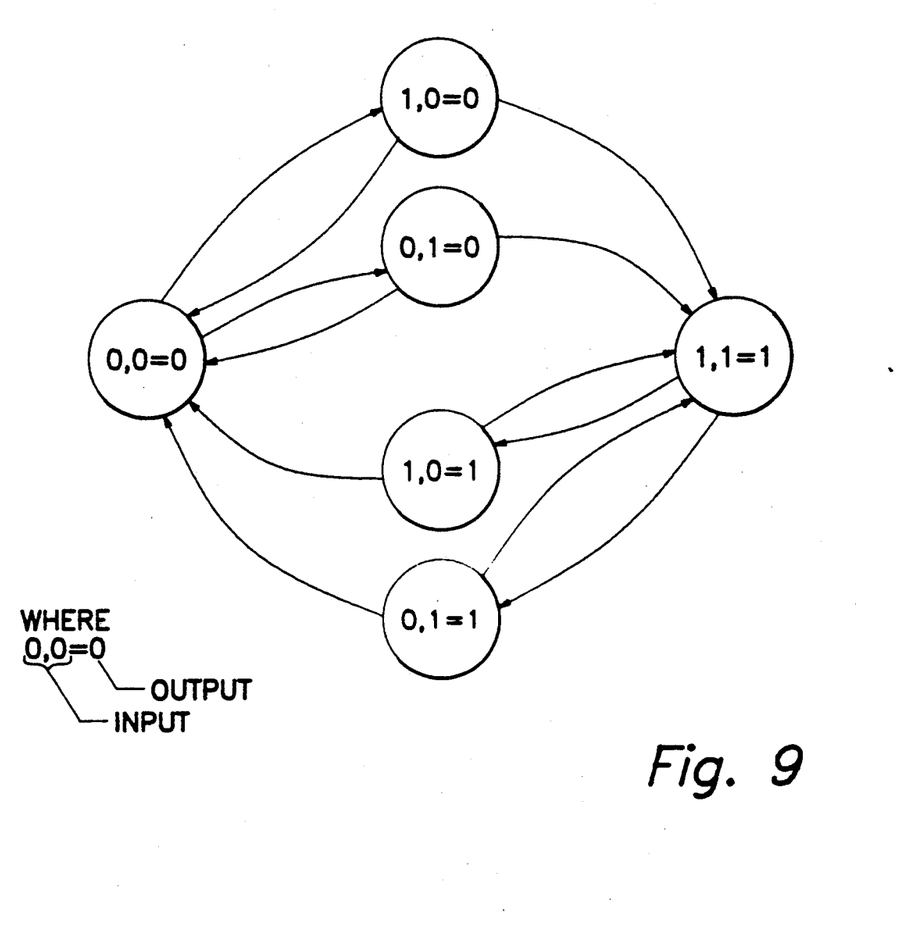
FIG. 9 shows a state diagram of the voting circuit of FIG. 8.

Referring to FIG. 8, there is shown a circuit diagram of the voting circuit 261 utilized in the testing of the relay coils 254 as shown in FIG. 7. A comparator 270 is utilized, and in conjunction with the proper choice of resistors, well known to those skilled in the art, the voting circuit 261 yields a state diagram as shown in FIG. 9. The voting circuit is such that there is a degree of memory or hysteresis inherent in the circuit such that the output remains the same until both inputs have been switched.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a system having at least one output device (21A), the output device having n output terminals, where n=1 to N, for outputting information, and wherein each output device has a corresponding redundant output device (21B), the corresponding redundant output device having corresponding n' output terminals, where n'=1' to N' for outputting information, the n and n' output terminals each being operatively connected to a corresponding m field device (250), where m=1 to N, through an apparatus, such that only the information outputted from one of the corresponding n and n' output terminals is coupled to the corresponding field device m, said apparatus comprising:

a) at least one fist current source means (211A) for outputting a current, each first current source means being connected to the corresponding output terminal (n) of the output device (21A), the current outputted from each first current source means containing the information outputted from each corresponding output terminal (n) of the output device (21A);

b) at least one second current source means (211B) for outputting a current, each second current source means being connected to the corresponding output terminal (n') of the corresponding redundant output device (21B), the current outputted from each second current source means containing the information outputted from each corresponding output terminal (n') of the redundant output device (21B);

c) at least one first diode (212A), each first diode connected to the corresponding first current source means (211A) and to corresponding first connector terminals (11A), and further wherein each connection between the first diode and the corresponding first current source means are each connected to corresponding second connector terminals (12A);

d) at least one second diode (212B), each second diode connected to the corresponding second current source means (211B) and to corresponding first redundant connector terminals (11B), and further wherein each connection between the second diode and the corresponding second current source means are each connected to corresponding second redundant connector terminals (12B), and further wherein each first redundant connector terminal (11B) is connected to the corresponding first connector terminal (11A), and further connected to the corresponding field device (250-1, 250-2, ..., 250-8), thereby providing a path for coupling information from the output terminals (n) of the output device and the output terminals (n') of the redundant output device to the corresponding field devices;

e) at least one switching means (253) for switching, the number of switching means being from 1 to n, each switching means having corresponding n first contact points (256) and n second contact points (257), each second connector terminals (12A, 22A, ... 82A), being connected to corresponding first contact points (256-1, 256-2, ..., 256-8), and each second redundant connector terminals (12B, 22B, .. 82B) being connected to corresponding second contact points (257-1, 257-2, ... 257-8); and f) activating means (254), operatively connected to the output device (21A) and the redundant output device (21B), for activating each switching means in response to control signals, control signal A and control signal B, CONTA and CONTB, respectively, from the output device and the redundant output device, such that the information outputted from the output terminals of the output device or the information outputted from the output terminals of the redundant output device is caused to be bypassed by the switching means resulting in the unbypassed information being coupled to the corresponding field device.

2. An apparatus, according to claim 1, wherein said apparatus further comprises:
 a) driver means, interposed between said activating means and said output device (21A) and said redundant output device (21B), for driving control signals to said activating means; and
 b) receiver means, interposed between said activating means and said output device (21A) and said redundant output device (21B), to output the control signals received by said driver means.

3. An apparatus, according to claim 2, wherein said apparatus further comprises:
 voting circuit means, operatively connected to said receiver means, for voting, to output a result signal indicating all the inputs have changed state, the result signal being coupled to the output device and the redundant output device.

4. An apparatus according to claim 3, wherein said switching means comprises:
 a) a plurality of single-pole double-throw relay contact sets.

5. An apparatus according to claim 4, wherein said activating means comprises:
 a) at least one relay coil, each relay coil controlling the operation of a plurality of relay contact sets.

6. In a system having at least one output device, the output device having a first set of output terminals for outputting information, wherein each of said first set of output terminals is operatively connected to a corresponding field device, and wherein each output device has a corresponding redundant output device, the redundant output device having a corresponding first set of output terminals for outputting information, each of said first set of output terminals of the redundant output device being operatively connected to the corresponding first set of output terminals of the corresponding output device, the output device and the redundant output device each having a second set of output terminals corresponding to the first set of output terminals, the second set of output terminals of the output device and the redundant output device being connected to an apparatus for controlling the information outputted from the first set of output terminals such that only the information outputted from the output device or the information outputted from the redundant output device is coupled to the corresponding field device, the apparatus including a plurality of switching elements each having a first contact point and second contact point, and an activating element for activating the switching element, a method for verifying the operability of said apparatus comprising the steps of:
 a) transmitting a first control signal from said redundant output device thereby preventing said activating element to cause the switching element to switch;
 b) transmitting a second control signal from said output device to cause the second control signal to stimulate the activating element nowithstanding the stimulation by the first control signal; and
 c) observing at least one resultant signal returned from the activating element to the redundant output device to compare to an expectant result thereby verifying the operability of the activating element.

* * * * *